United States Patent
Schroeder et al.

(10) Patent No.: US 6,366,686 B1
(45) Date of Patent: Apr. 2, 2002

(54) VIDEO ACQUISITION SYSTEM INCLUDING AN IMPROVED EVENT ARCHITECTURE

(75) Inventors: Charles G. Schroeder, Round Rock; Dan Repich, Austin; Kevin L. Schultz, Georgetown, all of TX (US)

(73) Assignee: National Instruments Corporation, Austin, TX (US)

( * ) Notice: Subject to any disclaimer, the term of this patent is extended or adjusted under 35 U.S.C. 154(b) by 0 days.

(21) Appl. No.: 09/233,400

(22) Filed: Jan. 19, 1999

(51) Int. Cl.[7] .............................................. G06K 9/00
(52) U.S. Cl. ...................................... 382/141; 348/151
(58) Field of Search .................................. 382/141, 140, 382/144, 285; 348/312, 222, 92, 143, 151, 152, 153, 154, 155, 156; 340/500, 501, 540, 541

(56) References Cited

U.S. PATENT DOCUMENTS

| | | | |
|---|---|---|---|
| 4,553,144 A | * 11/1985 | Houdard et al. ............... | 343/89 |
| 5,911,003 A | * 6/1999 | Sones ......................... | 382/162 |
| 6,025,854 A | 2/2000 | Hinz et al. | |
| 6,124,889 A | * 9/2000 | Landowski ................. | 348/312 |
| 6,195,475 B1 | * 2/2001 | Beausoleil, Jr. et al. .... | 382/312 |

* cited by examiner

*Primary Examiner*—Andrew W. Johns
*Assistant Examiner*—Seyed Azarian
(74) *Attorney, Agent, or Firm*—Conley, Rose & Tayon PC; Jeffrey C. Hood

(57) ABSTRACT

A data acquisition (DAQ) system and method which includes an improved event architecture. The DAQ device includes event logic coupled to receive one or more external or internal events from event sources. The event logic comprises one or more event selectors and one or more event mappers. The event selectors and event mappers receive event signals from event sources and selectively route the event signals to one or more destinations, also referred to as destination hardware elements. The destinations are operable to perform an action in response to receipt of the selected event signal. The event architecture of the present invention is designed to take advantage of both the flexibility of the traditional computer interrupt architecture and the speed of direct hardware mapping. At its essence, the hardware architecture comprises a mini, hardware, interrupt service routine. Hardware events or triggers are mapped to a set of board-level Events which are similar to the traditional idea of an interrupt. These hardware Events can then be mapped to cause a wide variety of direct hardware or software actions, similar to the traditional interrupt service routine, with the exception that the hardware events can be made to cause a wide variety of real-time or deterministic responses because no host processing is required.

29 Claims, 7 Drawing Sheets

Traditional Interrupt Architecture

Traditional Interrupt Architecture

New Event Architecture

| Source SIGNAL | Event Signal Description |
|---|---|
| Disabled | Disabled |
| DONE Pulse | A xx ns pulse asserted immediately after the last piece of data is stored in SDRAM |
| START Pulse | A yy ns pulse asserted immediately after the IMAQ capture mode has been initiated wither by a software command or event |
| AQ_IN_PROGRESS | A line that is asserted from the assertion edge of START Pulse until the unassertion edge of DONE Pulse |
| AQ_DONE | A pulse asserted from the assertion edge of DONE Pulse until the driver software recognizes the completion of the acquisition of the image into on-board memory |
| MASTER_ENABLE | A pulse asserted whenever all of the selected enabled lines for a specific camera are asserted, indication the presence of valid data on the input data lines |
| BAD_ROI | Asserted whenever the selected enables indicate that data from the camera is not valid, even though the user specified region of interest is indicates that data should be valid |
| HSYNC | Horizontal synchronization signal |
| VSYNC | Vertical synchronization signal |
| ROI_MATCH | A pulse indicating that the data currently on the data lines are within the user specified Region of Interest |
| SCALE_MATCH | A pulse indicating that the data currently on the data lines are to be stored into the SDRAM when the user has specified that on-board scaling is to be used |
| TIO_INTERRUPT | A pulse indicating the presence of an interrupt from the advanced timing and triggering ASIC on the IMAQ boards |
| TIO_CNTR 0:7 | The output signal 0:7 from the advanced timing and triggering ASIC on the IMAQ boards. This signal can be used as a programmable width pulse for advanced timing applications |
| TRIGIN_E(0:3) | The external trigger line (0:3) |
| TRIGIN_R(0:3) | The internal RTSI trigger (0:3) |

*Figure 6*
Table 1: Event Architecture Sources

| Destination SIGNAL | Event Signal Description |
| --- | --- |
| Disabled | Disabled |
| CAPTURE | An assertion on this event causes the next available image to be captured. |
| BAD_ROI | An assertion on this event causes the board to recognize the current capture as having violated the ROI requirements, thus generating an error. |
| HSYNC | When an event is mapped to the HSYNC signal, it is used by the control circuitry as the horizontal sync signal |
| VSYNC | When an event is mapped to the VSYNC signal, it is used by the control circuitry as the vertical sync signal |
| ROI_MATCH | An assertion on this signal allows an event to select which data on the external connector are valid data |
| TIO_CNTR 0:7 | The gate signal 0:7 from the advanced timing and triggering ASIC on the IMAQ boards. These signals can be used to start the generation of advanced timing operations. |
| FIELD | When an event is mapped to the FIELD signal, it is used by the control circuitry to identify whether the current field is the odd or even field. This field is only valid for interlaced camera types |
| TRIGIN_E(0:3) | The external trigger line (0:3) |
| TRIGIN_R(0:3) | The internal RTSI trigger (0:3) |

*Figure 7*
Table 2: Event Architecture Destinations

VIDEO ACQUISITION SYSTEM INCLUDING AN IMPROVED EVENT ARCHITECTURE

FIELD OF THE INVENTION

The present invention relates to video acquisition systems, and more particularly to a triggering and timing event architecture for a video acquisition system which provides deterministic response time for events while providing flexibility and configurability.

DESCRIPTION OF THE RELATED ART

The problem of acquiring video data into computer system memory (i.e. the main memory of a computer system) is increasingly the subject of attention in the field of image/video processing. As the performance of software image processing increases in response to improvements in CPU capacity, it is increasingly necessary to provide for fast and efficient acquisition of video frames from video source devices. Typical video sources include industrial cameras, camcorders, video cameras, VCRs, TV tuners, and laserdisk players.

Typically, a host computer system employs a video acquisition board to perform video frame acquisition. A video acquisition board is generally equipped with (a) an analog video port for coupling to an analog video source, (b) an A/D converter, (c) a frame acquisition buffer [RAM], (d) a bus connection to the host system, and (e) a DMA controller. In addition, a video board is often equipped with a digital video port for coupling to a digital video source.

An analog video source provides an analog video signal to the video board via the analog video port. The analog video signal is organized as a stream of video frames with a typical rate of 30 frames per second. The video board employs the A/D converter to digitize the analog video signal in response to synchronization information embedded in the analog video signal. The resulting digitized frame samples are temporarily stored in the frame acquisition buffer and then transferred to system memory.

A digital video source (e.g. a digital camera) provides a digital video signal to the video board via the digital video port. Since the digital video signal already comprises a stream of digitized video frames, the A/D converter (of the video board) is bypassed and frame data is stored directly into the frame acquisition buffer.

Engineers and computer vision system integrators historically have taken advantage of a wealth of personal computer hardware and software products to develop computer vision systems. Personal computers are extremely flexible in their form and function and are adept at handling image acquisition and processing. Often it is necessary to link or coordinate a vision action or function with events external to the computer. Examples of events include receipt of a strobe pulse for lighting or a pulse from an infrared detector that indicates the position of a widget on an assembly line. Additionally, sometimes it is desirable not only to be able to act on external events, but also to control external events. As an example, if a widget on an assembly line is detected by a vision system to be defective, the vision system may be required to generate a pulse to control a motor to push the bad widget off the assembly line.

In a traditional PC environment, external events to the computer are typically monitored via a system of interrupts. FIG. 1 illustrates a traditional interrupt architecture. When an external action occurs, a device in the system detects the action and asserts one of the computer system interrupt lines. Upon detecting an asserted state on this line, a computer interrupt controller, managing several possible interrupting sources, notifies the CPU, based on priority, of the interrupt. The CPU then stops executing the current processing task, identifies the source of the interrupt and allocates processing time to an interrupt service routine assigned to that interrupt source. This routine then verifies the interrupt and disarms it, after which it then performs some reaction to that interrupt in the form of generating a programmatic response to the original condition.

One of the main problems with this interrupt-based system is that it does not work well when the original computer stimulus has real-time response requirements. As an imaging example, many times it is important for an external line, called a trigger, to immediately cause an acquisition to occur. As a widget passes down a high-speed assembly line it may trip a sensor indicating that the widget is directly below the camera lens. When the sensor is tripped, the image must be taken at that exact moment in time. If too much time passes, the widget may have traveled passed the point at which capturing an image of the widget is still useful.

In the traditional interrupt architecture, there is no way to guarantee an absolute amount of time after receiving the trigger from the sensor that an image acquisition could be made. The time until the interrupt service routine is called depends on what other interrupts are currently being serviced and even the number of other devices which share a common bus interrupt level. Even after the interrupt service routine is called, making sure that the interrupt is cleared and then taking an action oftentimes means arbitrating for and transmitting over the PCI bus or other computer bus. All of these actions take time. Even worse, this time is non-deterministic and hence varies from interrupt to interrupt. In other words, even if the computer reacts in an appropriate time, the widget may appear in different parts of the final image depending on how much time each of the individual traditional interrupt components takes.

Some designs have addressed some of these issues by allowing an external stimulus to drive a specific board action. This architecture is used on the PCI-1408 and PXI-1408 IMAQ (image acquisition) boards from National Instruments. In this model an external stimulus or trigger is designed to effect a specific action. On the 1408 board, when a trigger is received, the board can be programmed to immediately start an acquisition. This design allows the board to initiate a capture immediately, in real-time, based on an external stimulus. There is no variable latency involved in notifying the processor and waiting on an interrupt service routine. However, this improved architecture has one major drawback—it has limited flexibility. One of the original strengths of the traditional computer interrupt architecture is its flexibility. If at first it is desired to start a video acquisition based on a trigger, but later other actions are desired, the interrupt architecture allows this change. However, hardware designs implemented to route triggers to specific actions are inflexible. For additional functionality these hardware designs must then fall back on traditional interrupt support for actions not specifically designed into the hardware.

Therefore, an improved system and method is desired for handling events in a video acquisition board. More particularly, an improved system and method is desired which enables the video acquisition board to respond to various types of hardware and software events in a deterministic and configurable manner with a minimal amount of extra hardware.

SUMMARY OF THE INVENTION

The present invention comprises a data acquisition (DAQ) system and method which includes an improved event architecture. In the preferred embodiment, the DAQ system is a video capture system. The video capture system preferably comprises a host computer coupled to a video source, such as a video camera. The host computer includes a CPU, a system memory, a peripheral bus, and a video capture board, also referred to as an image acquisition device, coupled to the peripheral bus of the computer which receives the video data from the video source. The image acquisition device includes an event architecture according to the present invention.

In the preferred embodiment, the image acquisition device includes event logic coupled to receive one or more external or internal events from event sources. The event logic comprises one or more event selectors and one or more event mappers. The event selectors each include a plurality of inputs and at least one output. For each event selector, the plurality of inputs are preferably each adapted to couple to a respective event source to receive an event signal. The event selectors operate to select one of the event signals and provide the selected event signal on an output to a corresponding event mapper. The corresponding event mapper receives the selected event signal and provides the selected event signal to one or more destinations, also referred to as destination hardware elements. In the preferred embodiment, each of the event selectors comprises one or more multiplexers, and each of the event mappers comprises one or more demultiplexers.

The destinations are operable to perform an action in response to receipt of the selected event signal. More particularly, the event selectors and the event mappers are configurable to provide an event signal from an event source to a selected destination, and the destinations are operable to cause an action to be performed by the image acquisition device in response to assertion of an event signal by an event source. The event logic is thus configurable to enable hardware processing of one or more events by one or more of said destination hardware elements for real time or determinable response requirements.

In the preferred embodiment, the image acquisition device comprises a board comprised in a computer system. In this embodiment, the image acquisition device further comprises an event interrupt combiner coupled to outputs of one or more of the event mappers. The event interrupt combiner receives one or more of the selected event signals output from the event mappers and generates a single interrupt signal which is provided to the computer system.

BRIEF DESCRIPTION OF THE DRAWINGS

A better understanding of the present invention can be obtained when the following detailed description of the preferred embodiment is considered in conjunction with the following drawings, in which:

FIG. 6 is a table illustrating event architecture sources;

FIG. 7 is a table illustrating event architecture destinations.

Figure 1:
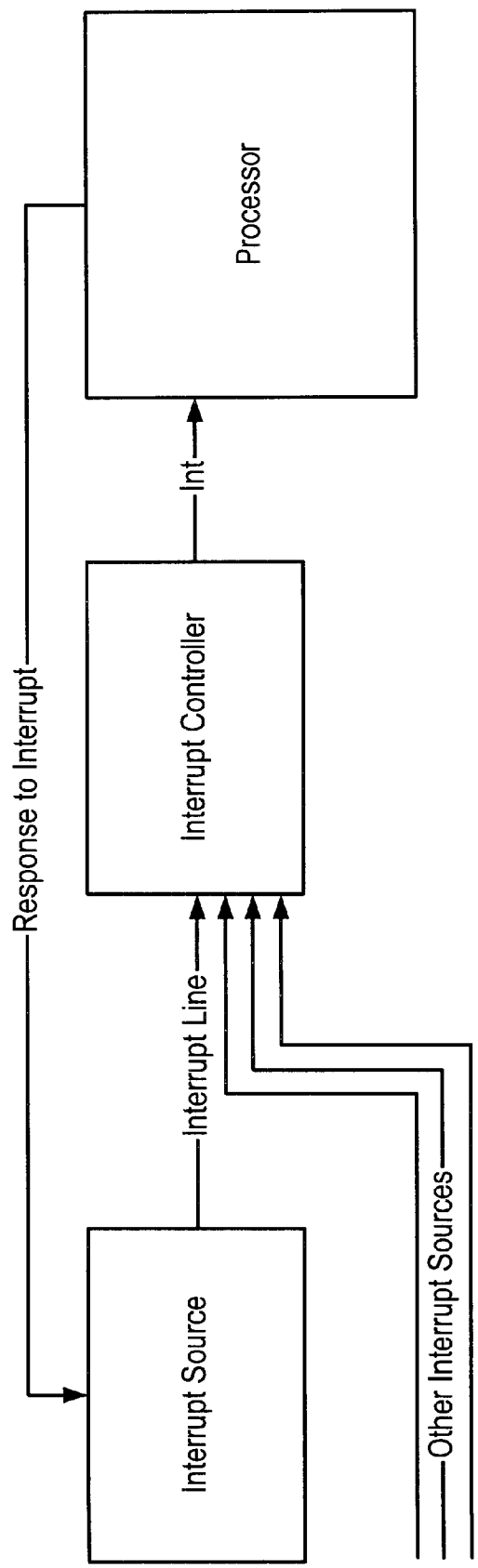
FIG. 1 illustrates a traditional interrupt architecture according to the prior art.

While the invention is susceptible to various modifications an alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
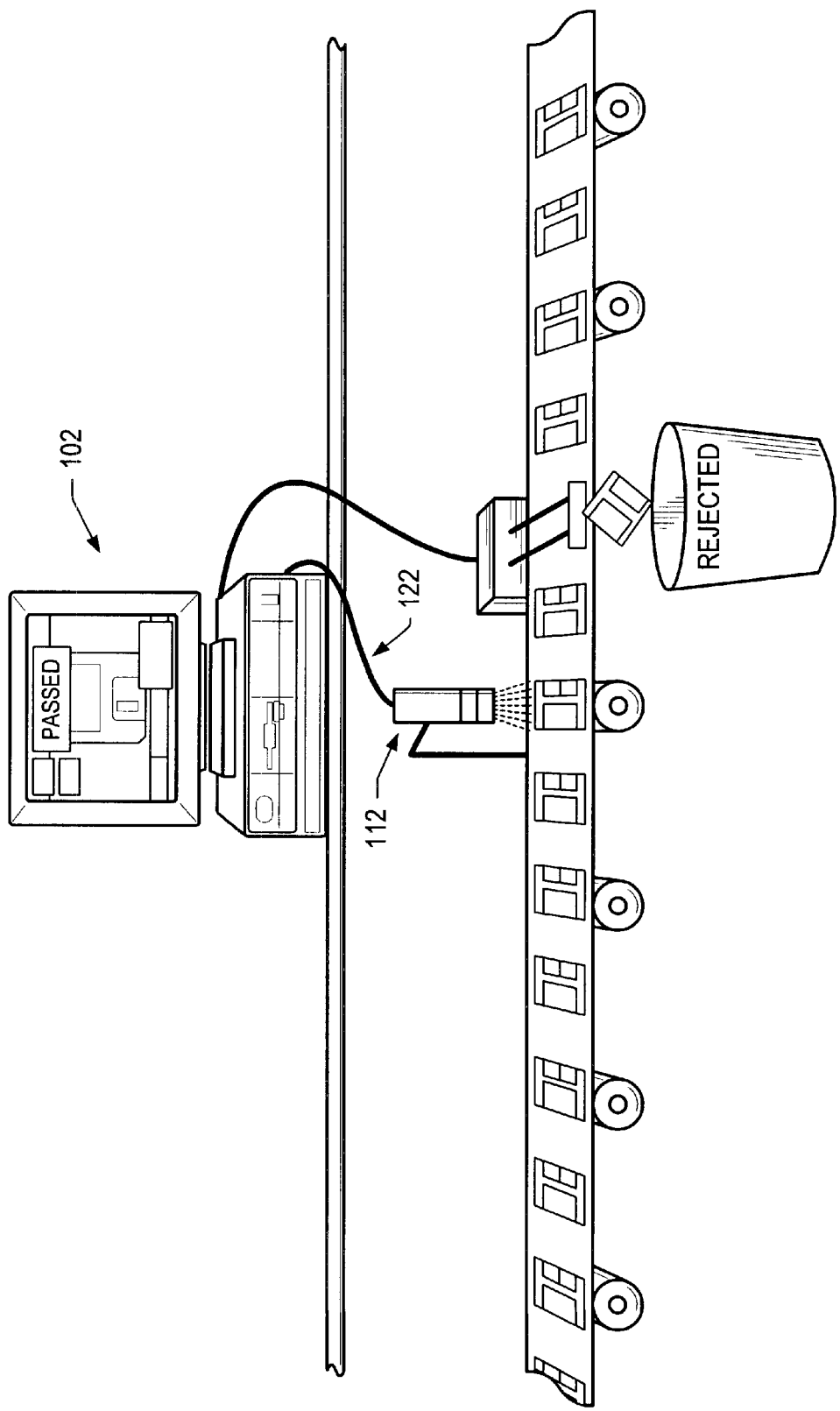
FIG. 2 illustrates a video capture system according to one embodiment of the present invention.

FIG. 2—Video Capture System

FIG. 2 illustrates a video capture system according to the preferred embodiment of the present invention. The video capture system comprises a host computer 102 and a video source 112. The host computer 102 includes a video capture board (214 FIG. 3). The video source 112 preferably produces a digital video signal which comprises a sequence of video frames, or other data desired to be acquired. The digital video signal is provided through a wire or cabling 122 to the host computer 102 for storage and/or processing. The host computer 102 may also receive events, such as triggers, from an external source which operate to trigger operation of the video capture system. The host computer 102 may also receive data which is analyzed to monitor external conditions and generate events for triggering operation of the video capture system.

It is noted that the event architecture of the present invention is preferably included in a video or image capture system. However, the event architecture of the present invention may be included in various boards or systems, such as a general purpose data acquisition/generation system or board, or another type of special purpose data acquisition/generation system or board. For example, in one embodiment, the event architecture of the present invention is comprised on a data acquisition (DAQ) board, such as those available from National Instruments.

Figure 3:
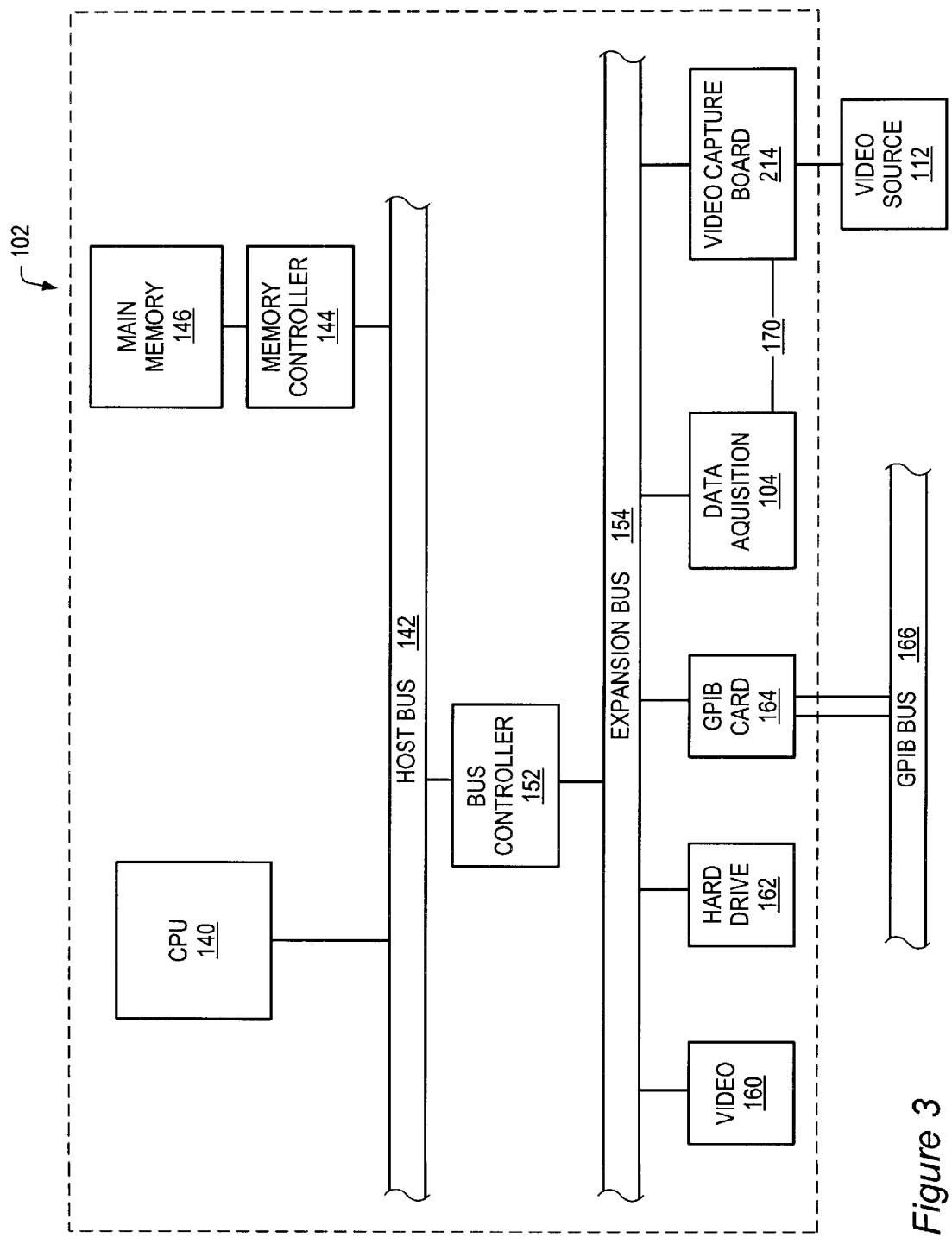
FIG. 3 is a block diagram of the computer system of FIG. 2.

FIG. 3—Computer Block Diagram

FIG. 3 illustrates a representative block diagram of the computer system 102 of FIG. 3. It is noted that the computer system 102 may have various different architectures, as desired. The elements of a computer system not necessary to understand the operation of the present invention have been omitted for simplicity.

The computer system 102 includes a central processing unit or CPU 140 which is coupled to a processor or host bus 142. The CPU 140 may be any of various types, including an Intel x86 processor such as the Pentium class from Intel, a PowerPC CPU from the Motorola family of processors, as well as others.

Main memory 146, also referred to as system memory 146, is coupled to the host bus 142 by means of memory controller 144. The system memory 146 stores various software used in the DAQ system 100, including image acquisition software. The image acquisition software is preferably the N-IMAQ driver level software from National Instruments. Where the computer system 102 includes DAQ card 104, the system memory 146 stores DAQ driver software, preferably NI-DAQ from National Instruments. The system memory 146 may store other software or other image acquisition related software, as desired.

Host bus 142 is coupled to an expansion or input/output bus 154 by means of a bus controller 152. The expansion bus 154 is preferably the PCI (peripheral Component Interconnect) bus, and the bus controller 152 is preferably chipset logic, available from Intel Corporation. The expansion bus 154 includes slots for various devices, including video 160.

A non-volatile memory or hard drive 162 is comprised in the computer system 102 and may be coupled to the expansion bus 154 or to the chipset 152, or to other logic. The non-volatile memory 162 stores an operating system, image acquisition software, as well as other application programs, for loading into the system memory 146 as known in the art.

A video capture board 214 according to the present invention is coupled to the expansion bus 154. The video capture board 214 includes an event architecture which provides improved programming and configurability. The video capture board 214 is also referred to as an image acquisition (IMAQ) board.

Data acquisition device or card 104 may optionally be connected to the expansion bus 154. The DAQ device 104 is optionally coupled to acquire data from a device or process. The DAQ device 104 is preferably coupled to the video capture board 214 through a RTSI (Real Time Systems Integration) bus 170. The data acquisition card 104 receives analog (or digital) signals from an external sensor or instrument and in turn produces digital data that is provided to the CPU 140 and/or the system memory 146. The DAQ card 104 may also generate trigger signals in response to received data, wherein the trigger signals are provided over the RTSI bus to the video capture board 214. The DAQ card 104 is controlled by DAQ driver level software executing in the computer system 102.

Thus the DAQ device 104 is operable to acquire and analyze data in order to monitor an external process or system, and then generate a trigger or event to the video capture board 214 when a desired condition occurs.

The computer system 102 may also include a GPIB (General Purpose Interface Bus) card 164 that interfaces to one or more instruments via the GPIB bus 166, and may include a MXI card (not shown) that connects to a VXI chassis (not shown).

Figure 4:
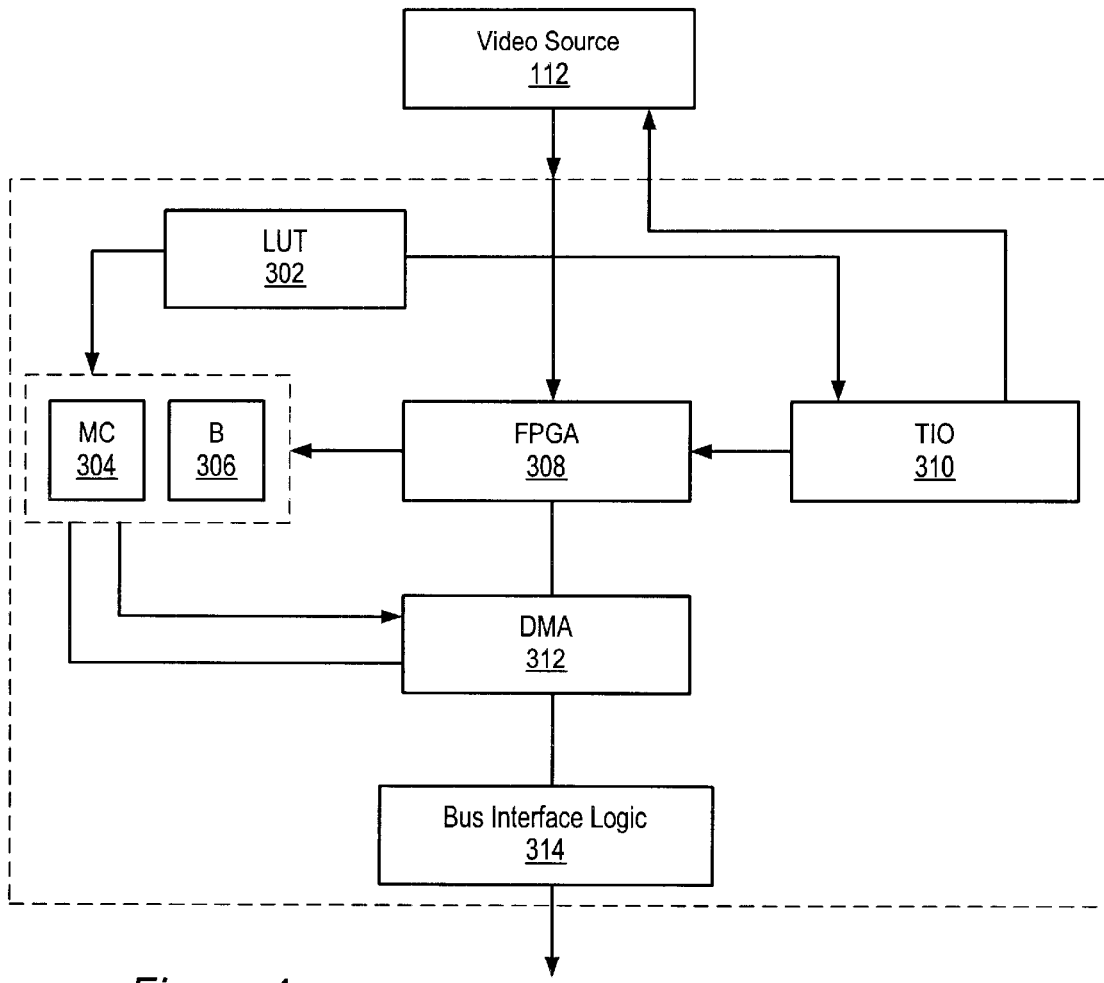
FIG. 4 is a block diagram of the video capture board according to the present invention.

FIG. 4—Video Capture Board

FIG. 4 is a more detailed block diagram of one embodiment of the video capture board 214. In the preferred embodiment, the video capture board 214 comprises a digital video port 300, a look-up table (LUT) 302, a memory controller 304 and associated frame acquisition buffer 306, a programmable logic element such as an FPGA 308, a timing I/O (TIO) device 310, a DMA controller 312, and peripheral bus interface logic 314.

The video source 112 (e.g. a digital video camera) produces a digital video signal. The digital video signal comprises pixel data for an image or frame. The video source 112 is coupled to digital video port 300, and provides the video capture board 214 with a digital video input signal or digital video data. The digital video input signal is provided through a look-up table (LUT) 302 to a memory system comprising memory controller 304 and buffer memory 306. The LUT 302 operates to map color pixel values to new values for desired processing functions.

Buffer memory 306 preferably comprises Synchronous Dynamic Random Access Memory (SDRAM). The memory controller 304 is coupled to buffer memory 306 via an address/data bus. The memory controller 304 includes logic which operates to configure the buffer 306 as a virtual dual ported FIFO.

The video source 112 is coupled to provide one or more control signals to control logic 308, which is preferably implemented in an FPGA. These control signals indicate the address of the received video data. The FPGA 308 receives the control signals and provides control information to the memory controller 304. The FPGA 308 uses the control signal to determine when the data will be valid at the memory controller 304, and the FPGA 308 provides a control signal or control information to the memory controller 304 when the video data is available to be latched.

Therefore, the video source 112 provides a control signal to the FPGA 308, and the FPGA 308 in turn provides control information to the memory controller 304. The memory controller 304 uses this information to determine whether the video source 112 is currently providing write data or image data to the video capture board 214. More particularly, when the FPGA 308 senses or detects valid data, the control FPGA asserts a write enable (WE) signal to the memory controller 304. When the memory controller 304 detects the WE signal asserted, the memory controller 304 begins latching data as long as the WE signal is held in the asserted state. When this data is latched into the memory controller 304, the memory controller 304 then writes the received video data into the SDRAM buffer 306. When the memory controller 304 writes video data into the memory buffer 306, the memory controller 304 indicates to the DMA controller 312 that data is available to be read, as discussed further below.

According to the present invention, the FPGA 308 includes an event system architecture which provides a deterministic event and interrupt system that provides flexibility and configurability.

The video source 112 further provides control/timing signals to the timing I/O (TIO) chip 310. The TIO chip provides advanced timing information to the FPGA 308 to enable performance of operations such as scaling and region of interest.

The DMA controller 312 is coupled to the memory system, preferably to the memory controller 304. The DMA controller 312 is also coupled to the FPGA 308 and to the peripheral bus interface logic 314. The peripheral bus interface logic 314 is coupled to the peripheral bus 212. The DMA controller 312 is responsible for reading video data from the frame acquisition buffer 306 and transferring the video data to system memory 206.

Therefore, the video source 112 operates to provide video data to the memory controller 304, and the memory controller 304 writes the video data into the buffer 306. The DMA controller 312 operates to read video data from the memory system and provide the read video data to the system memory 206 of the computer system. Further, since the memory buffer 306 comprises synchronous dynamic random access memory (SDRAM), the memory controller 304 is required to generate refresh cycles to the dynamic RAM 306 to periodically refresh the memory 306. Therefore, the memory controller 304 operates to arbitrate for three different types of accesses to the memory buffer 306, these being writes from the video source 112, reads from the DMA controller 312, and refresh cycles performed by the memory controller 304 itself.

Figure 5:
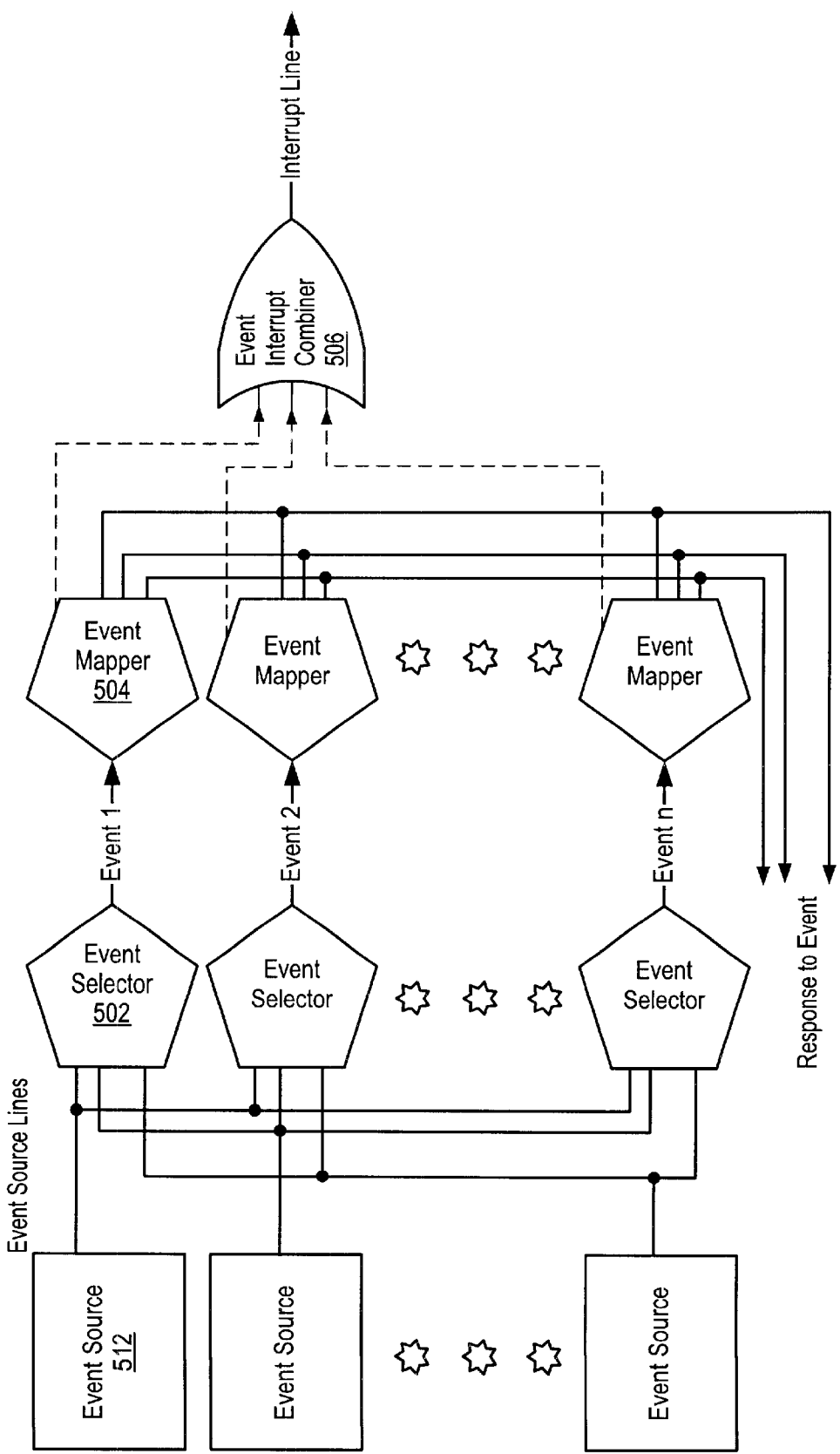
FIG. 5 is a block diagram of the event system architecture comprised in the video capture board of the present invention.

FIG. 5—Event Architecture

FIG. 5 is a block diagram of the event system architecture according to the preferred embodiment of the present invention. In the preferred embodiment, the event logic is implemented in the FPGA 308 comprised on the video capture board 214. It is noted that the event logic may be implemented in other ways such as a programmable CPU or controller executing a real-time operating system (RTOS), discrete logic, or other programmable logic as desired. However, these other implementations require a much larger amount of additional hardware than the described Event architecture.

As shown, event logic comprises a plurality of event selectors 502, a plurality of event mappers 504, and one or more event interrupt combiners 506. The event selectors 502, event mappers 504, and one or more event interrupt combiners 506 are implemented in the FPGA 308. As shown, the FPGA 308 is coupled to one or more event sources 512. The event sources 512 are equivalent to the traditional interrupt source and may comprise one or more of a hardware stimulus, trigger, software interrupt, etc.

The event selectors 502 are operable to receive input from one or more of the event sources 512. As shown, each event selector 502 outputs an event line or event signal to a corresponding event mapper 504. The event selectors 502 enable the user to specify which event sources drive each event line. In other words, the event selectors 502 operates to select one of its input event signals for provision at its output. The event mappers 504 operate to receive their respective selected event signals and map these event signals to one or more destinations, also referred to as destination hardware elements. Each destination hardware element is operable to perform an action in response to receipt of one of the event signals. Each of the event mappers 504 may provide event signals to any of various logic on the video capture board 214 to perform a function in response to the event.

The event mappers 504 also preferably provide outputs to event interrupt combiner 506. The event interrupt combiner 506 provides a single output which is provided to the interrupt line in the computer system 102. Thus, the event interrupt combiner 506 allows any onboard hardware events to be mapped back to a traditional interrupt service routine executing in the computer system 102. More detail on each of the components comprised in the event architecture of FIG. 5 is provided below.

The Event architecture of the present embodiment is designed to take advantage of both the flexibility of the traditional PCI interrupt architecture and the speed of direct hardware mapping with a minimal amount of additional hardware. At its essence, this hardware architecture comprises a mini, hardware, interrupt service routine. In the present embodiment, hardware events or triggers are mapped to a set of board-level Events which are similar to the traditional idea of an interrupt. These hardware Events can then be mapped to cause a wide variety of direct hardware or software actions, similar to the traditional interrupt service routine, with the exception that the hardware events can be made to cause a wide variety of real-time or deterministic responses because no signal is required to be sent to the processor.

Event Sources

Referring again to FIG. 5, event sources in this architecture are equivalent to the traditional interrupt source. These sources may be any hardware stimulus or trigger. In the case of the IMAQ PCI boards of the present embodiment, possible sources fall into three main categories: off-board triggers, on-board status signals, and software commands.

The off-board triggers generally are received from one of two places. The off-board triggers may be received from external trigger lines, which interface to extra-computer sources such as the sensor in the widget example described above. The off-board triggers may also be received from (Real Time Systems Integration) RTSI lines, which originate from another board or device comprised in the computer system 102, such as DAQ board 104. For instance, the type of trigger for a specific application may be more involved than a simple on/off switch where a widget is/is not present under the camera. In a thermal imaging application, for example, an image may be required to be captured when the temperature reaches an exact value. In this case, a National Instruments data acquisition board, e.g., board 104, may be monitoring a temperature sensor. When the temperature reaches the precise target value, the DAQ board 104 can then trigger, over the RTSI bus 170, the IMAQ board 214 in real-time to capture an image.

The on-board signals which can be used as event sources come from a pool of status and control signals present on the video capture board 214. A list of the possible hardware signals which can be used is found in Table 1 shown in FIG. 6. Each of these possible sources is programmable in polarity so that actions can be taken based on either the rising or falling edge of any of these signals.

Lastly, actions can also be taken from software commands, as well. In a universal view of the concept of events, there is no distinction between events occurring based on hardware stimuli and events based on software commands. For example, the user may desire to generate a software driven event, whereby, after an image processing function returns, a software command is automatically generated to capture the next image. For true real-time support, hardware events are, of course, the preferred option. However, the user/driver developer can use combinations of Events in hardware and software to match the needs of each particular application.

Event Selectors On each video capture board 214, there are a limited number of Events due to space limitations. The currently implemented embodiment includes 6 Events with space reserved for up to 32 total Events. The event selector circuitry 502 simply allows the user to specify which event sources drive each Event line. In the traditional PC interrupt architecture, this circuitry is analogous to the interrupt controller, which takes interrupts from several sources and maps these interrupts to a single processor interrupt line. In the event architecture, however, there is not a single interrupt line, but rather many Event lines. By implementing more than one Event, several hardware actions can be executed in parallel, rather than the serial implementation to which CPU interrupts must adhere.

As discussed above, the event selectors 502 are each operable to receive input from one or more of the event sources 512 and output an event line or event signal to a corresponding event mapper 504. The event selectors 502 enable the user to specify which event sources drive each event line. In the preferred embodiment, the event selectors 502 are each comprised of one or more multiplexers. The one or more multiplexers include a plurality of inputs for receiving a plurality of event source signals and include an output for providing a selected event signal to a corresponding event mapper 504. The one or more multiplexers comprising each event selector 502 receive one or more select signals for selecting the respective event which is provided at the output of the event selector 502. The select signals are generated or configured by the user during configuration of the event logic.

Event Mapper

The Event mapper circuitry receives the Event lines and maps them back out to a set of destinations, also referred to as destination hardware elements. In the preferred embodiment, a destination hardware element refers to hardware logic, e.g., programmable logic such as an FPGA, discrete logic, etc., which is coupled to receive an event signal output from one of the event mappers 504, wherein the destination hardware element is operable to perform an action in response to receipt of one of the event signals. A list of the possible hardware destinations is shown in Table 2 shown in FIG. 7. Thus, examples of a destination hardware element include the timing I/O (TIO) device 310 and the memory controller and/or video capture logic comprised on the board which captures a video image. It is noted that the hardware destinations shown in Table 2 are illustrative only, and other hardware destinations or destination hardware elements may be included, as desired.

In the preferred embodiment, the event mappers 504 are each comprised of one or more demultiplexers. The one or more demultiplexers include an input for receiving an event signal and include an output for providing the event signal to a corresponding hardware element, or to the event interrupt combiner 506. The one or more demultiplexers comprising each event mapper 504 receive one or more select signals for selecting the respective hardware element to which the event signal is provided. The select signals provided to the event mappers 504 are generated or configured by the user during configuration of the event logic.

The event destinations are used to effect or perform an action based on the assertion of one of the event sources. The event mappers 504, in essence, provide the ability to the user to execute a number of small instructions, the equivalent of a small interrupt service routine, in hardware, in response to a received event. Stated another way, the event mappers 504 route selected event signals to a hardware element, wherein the hardware element performs a function in response to the received event, similar to execution of an ISR.

For instance, if the user wishes to start a capture after 104.6 milliseconds, he/she can simply use an event selector 502 to select the output of one of the TIO_CNTR signals. The user can then use the corresponding event mapper 504 to map this Event to the CAPTURE signal. After issuing the command, the advanced counters will count for exactly 104.6 milliseconds and then, at that precise time, will generate an event which is routed through the event selector 502 and the event mapper 504 to the CAPTURE signal, which operates to initiate the acquisition of the next video frame.

In the above two examples, the performance of timing operations in software would be impossible to perform with any consistency or accuracy due to the timing variables discussed earlier. Additionally, operating system timers are seldom this precise. If a hardware counter on a prior art board were to be used as a replacement, the prior art board would still have to use the system of traditional interrupts, which as already discussed are not real-time capable or determinable. Without the Event architecture, an indeterminate latency exits for the write to the capture PC hardware after the timer has expired which initiates the next transfer. The Event architecture of the present embodiment provides an improved implementation of this type of application.

In the preferred embodiment Events also have the ability to be combined. To use the example above, assume the requirements of the user change to capturing an image 104.8 microseconds after the assertion edge of an external trigger signal, e.g., 104.8 microseconds after the item is detected at a predetermined point on an assembly line. In this case, the event architecture still works well. Now, however, two events are used to complete the operation. First, one event is generated, e.g., when the item is detected at the predetermined point on the assembly line, and this event can be used to map the appropriate trigger signal to start one of the advanced timers. When the timer counts the pre-determined amount of time, a second event is generated by the timer which maps to the CAPTURE command. The user now has a real-time implementation in hardware of his exact needs. The example helps to illustrate the flexibility of the event architecture. Many events can be chained together to perform a number of possible hardware responses.

Event Interrupt Combiner

As discussed above, an event, at least from a user perspective, should be a general term free from distinction between hardware and software. To continue this paradigm, the event interrupt combiner circuitry 506 is useable to link one or more events to the traditional PC interrupt architecture. This allows any of the on-board hardware events to be mapped back to a traditional interrupt service routine.

As an example of operation of the event interrupt combiner circuitry 506, assume that a user wishes to start the capture of the next image immediately after the acquisition of the current image. Additionally, the user would like the driver software to automatically make a callback to a user specified image processing function so that, as soon as the current image is in memory, the function gets called immediately. To perform this task in the event architecture, the user could simply map the AQ_DONE signal to the capture signal, while enabling the event interrupt combiner 506 to propagate that event back to the appropriate PCI interrupt line. Then, as soon as the current acquisition is complete, the event simultaneously and immediately initiates the next capture, while generating a traditional interrupt to the N-IMAQ driver software executing on the computer system 102. The driver software, upon receiving the interrupt, can identify the event causing the interrupt and immediately pass control to the user' image processing function.

Although the system and method of the present invention has been described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. An image acquisition device for acquiring one or more video images from a video source, the image acquisition device comprising:

an input for receiving video data from a video source;

a buffer memory coupled to said input which stores said digital video data; and a memory controller coupled to the input and to the buffer memory, wherein the memory controller is operable to write digital video data to the buffer memory and read digital video data from the buffer memory;

event logic coupled to the memory controller and coupled to receive one or more external or internal events, wherein said event logic comprises:

one or more event selectors, wherein each of said event selectors includes a plurality of inputs and at least one output, wherein, for each event selector, at least one of said plurality of inputs is adapted to couple to an event source to receive an event signal from the event source, wherein each of said event selectors is operable to select one of said event signals and provide said selected event signal on said at least one output;

one or more event mappers, wherein each of said one or more event mappers corresponds to at least one of said event selectors, wherein each of said event mappers includes an input which receives one of said selected event signals output from a corresponding one of said event selectors, wherein each of said event mappers is operable to provide said selected event signal to one or more destinations;

wherein said destinations are operable to cause an action to be performed by the image acquisition device in response to receipt of said selected event signal;

a timing/triggering circuit having a plurality of timers and/or counters, each timer and/or counter operable to function independently of the other timers and/or counters;

wherein each one of said one or more event selectors is operable to be assigned to an output of one of the plurality of timers and/or counters, and wherein each one of said one or more event mappers is operable to be assigned to an input of one of the plurality of timers and/or counters, wherein the event logic is operable to generate and sequence separate internal or external events.

2. The image acquisition device of claim 1, wherein said one or more event selectors and said one or more event mappers are configurable to provide an event signal from an event source to a selected destination;

wherein said destinations are operable to cause an action to be performed by the image acquisition device in response to assertion of an event signal by an event source.

3. The image acquisition device of claim 1, further comprising:

one or more destination hardware elements which are each coupled to receive one of said selected event signals output from one of said one or more event mappers, wherein each of said one or more destination hardware elements is operable to perform an action in response to receipt of one of said selected event signals.

4. The image acquisition device of claim 3, wherein said event logic is configurable to enable hardware processing of one or more events by one or more of said destination hardware elements for real time or determinable response requirements.

5. The image acquisition device of claim 3, wherein said one or more destination hardware elements include video capture logic for acquiring video data from the video source.

6. The image acquisition device of claim 3, wherein said one or more destination hardware elements include timing logic for counting a time duration.

7. The image acquisition device of claim 1, wherein the event logic comprises a plurality of event selectors and a plurality of event mappers;

wherein each of said plurality of event mappers corresponds to at least one of said event selectors, wherein two or more of said event selectors and a corresponding two or more of said event mappers are operable to provide two or more selected event signals to two or more destinations substantially concurrently.

8. The image acquisition device of claim 1, wherein the image acquisition device comprises a board comprised in a computer system;

wherein said event sources are selected from the group comprising: off-board signals, on-board signals, and software commands.

9. The image acquisition device of claim 1, wherein the image acquisition device comprises a board comprised in a computer system; the image acquisition device further comprising:

an event interrupt combiner coupled to outputs of one or more of said event mappers, wherein said event interrupt combiner is operable to receive one or more of said selected event signals from said one or more of said event mappers and generate an interrupt signal which is provided to the computer system.

10. The image acquisition device of claim 1, wherein each of said event selectors comprises one or more multiplexers;

wherein each of said event mappers comprises one or more demultiplexers.

11. A data acquisition device for acquiring and/or generating data, the data acquisition device comprising:

a port for receiving and/or generating data;

data acquisition logic for performing data acquisition/generation functions;

a memory coupled to said port which stores received data; and event logic coupled to the memory controller and coupled to receive one or more external or internal events, wherein said event logic comprises:

one or more event selectors, wherein each of said event selectors includes a plurality of inputs and at least one output, wherein, for each event selector, at least one of said plurality of inputs is adapted to couple to an event source to receive an event signal from the event source, wherein each of said event selectors is operable to select one of said event signals and provide said selected event signal on said at least one output;

one or more event mappers, wherein each of said one or more event mappers corresponds to at least one of said event selectors, wherein each of said event mappers includes an input which receives one of said selected event signals output from a corresponding one of said event selectors, wherein each of said event mappers is operable to provide said selected event signal to one or more destinations;

wherein said destinations are operable to cause an action to be performed by the data acquisition device in response to receipt of said selected event signal;

a timing/triggering circuit having a plurality of timers and/or counters, each timer and/or counter operable to function independently of the other timers and/or counters;

wherein each one of said one or more event selectors is operable to be assigned to an output of one of the plurality of timers and/or counters, and wherein each one of said one or more event mappers is operable to be assigned to an input of one of the plurality of timers and/or counters, wherein the event logic is operable to generate and sequence separate internal or external events.

12. The data acquisition device of claim 11, wherein said one or more event selectors and said one or more event mappers are configurable to provide an event signal from an event source to a selected destination;

wherein said destinations are operable to cause an action to be performed by the data acquisition device in response to assertion of an event signal by an event source.

13. The data acquisition device of claim 11, further comprising:

one or more destination hardware elements which are each coupled to receive one of said selected event signals output from one of said one or more event mappers, wherein each of said one or more destination hardware elements is operable to perform an action in response to receipt of one of said selected event signals.

14. The data acquisition device of claim 13, wherein said event logic is configurable to enable hardware processing of one or more events by one or more of said destination hardware elements for real time or determinable response requirements.

15. The data acquisition device of claim 13, wherein the data acquisition device comprises an add-in board comprised in a computer system.

16. The data acquisition device of claim 11, wherein the data acquisition device comprises a board comprised in a computer system;
wherein said event sources are selected from the group comprising: off-board signals, on-board signals, and software commands.

17. The data acquisition device of claim 11, wherein the data acquisition device comprises a board comprised in a computer system; the image acquisition device further comprising:
an event interrupt combiner coupled to outputs of one or more of said event mappers, wherein said event interrupt combiner is operable to receive one or more of said selected event signals from said one or more of said event mappers and generate an interrupt signal which is provided to the computer system.

18. The data acquisition device of claim 11, wherein each of said event selectors comprises one or more multiplexers;
wherein each of said event mappers comprises one or more demultiplexers.

19. A data acquisition device for acquiring and/or generating data, the data acquisition device comprising:
a port for receiving and/or generating data;
data acquisition logic for performing data acquisition/generation functions;
a memory coupled to said port which stores received data;
event logic coupled to the memory controller and coupled to receive one or more external or internal events, wherein the event logic comprises event routing logic, the event routing logic including a plurality of inputs and a plurality of outputs, wherein each of said plurality of inputs is adapted to couple to an event source to receive an event signal, wherein the event routing logic is operable to select at least one of said event signals and output said selected event signal on a selected one of said plurality of outputs to provide said selected event signal to one or more destinations;
wherein said destinations are operable to cause an action to be performed by the data acquisition device in response to receipt of said selected event signal; and
a timing/triggering circuit having a plurality of timers and/or counters, each timer and/or counter operable to function independently of the other timers and/or counters;
wherein each one of said one or more event selectors is operable to be assigned to an output of one of the plurality of timers and/or counters, and wherein each one of said one or more event mappers is operable to be assigned to an input of one of the plurality of timers and/or counters, wherein the event logic is operable to generate and sequence separate internal or external events.

20. The data acquisition device of claim 19, wherein the event routing logic is configurable to provide an event signal from an event source to a selected destination;
wherein said destinations are operable to cause an action to be performed by the data acquisition device in response to assertion of an event signal by an event source.

21. The data acquisition device of claim 19, further comprising:
one or more destination hardware elements which are each coupled to receive one of said selected event signals output from said event routing logic, wherein each of said one or more destination hardware elements is operable to perform an action in response to receipt of one of said selected event signals.

22. The data acquisition device of claim 19, wherein said event logic is configurable to enable hardware processing of one or more events by one or more of said destination hardware elements for real time or determinable response requirements.

23. The data acquisition device of claim 19, wherein the event routing logic comprises:
one or more event selectors, wherein each of said event selectors includes a plurality of inputs and at least one output, wherein, for each event selector, at least one of said plurality of inputs is adapted to couple to an event source to receive an event signal, wherein each of said event selectors is operable to select one of said event signals and provide said selected event signal on said at least one output;
one or more event mappers, wherein each of said one or more event mappers corresponds to at least one of said event selectors, wherein each of said event mappers includes an input which receives one of said selected event signals output from a corresponding one of said event selectors, wherein each of said event mappers is operable to provide said selected event signal to one or more destinations.

24. An image capture system comprising:
a computer system comprising a central processing unit;
an image acquisition device coupled to the computer system for acquiring one or more video images from a video source, the image acquisition device comprising:
an input for receiving video data from a video source;
a buffer memory coupled to said input which stores said digital video data; and
a memory controller coupled to the input and to the buffer memory, wherein the memory controller is operable to write digital video data to the buffer memory and read digital video data from the buffer memory;
event logic coupled to the memory controller and coupled to receive one or more external or internal events, wherein said event logic comprises:
one or more event selectors, wherein each of said event selectors includes a plurality of inputs and at least one output, wherein, for each event selector, at least one of said plurality of inputs is adapted to couple to an event source to receive an event signal from the event source, wherein each of said event selectors is operable to select one of said event signals and provide said selected event signal on said at least one output;
one or more event mappers, wherein each of said one or more event mappers corresponds to at least one of said event selectors, wherein each of said event mappers includes an input which receives one of said selected event signals output from a corresponding one of said event selectors, wherein each of said event mappers is operable to provide said selected event signal to one or more destinations;

wherein said destinations are operable to cause an action to be performed by the image acquisition device in response to receipt of said selected event signal;

wherein said central processing unit on said computer system is not required to service interrupts arising from said event signals.

25. The image capture system of claim 24, wherein the computer system comprises one of:

a personal computer;

a PDA;

an industrial computer;

a PXI computer.

26. The image capture system of claim 24, wherein the image acquisition device further comprises:

a timing/triggering circuit having a plurality of timers and/or counters, each timer and/or counter operable to function independently of the other timers and/or counters;

wherein each one of said one or more event selectors is operable to be assigned to an output of one of the plurality of timers and/or counters, and wherein each one of said one or more event mappers is operable to be assigned to an input of one of the plurality of timers and/or counters, wherein the event logic is operable to generate and sequence separate internal or external events.

27. A data acquisition system comprising:

a computer system comprising a central processing unit;

a data acquisition device coupled to the computer system for acquiring and/or generating data, the data acquisition device comprising:

a port for receiving and/or generating data;

data acquisition logic for performing data acquisition/generation functions;

a memory coupled to said port which stores received data; and event logic coupled to the memory controller and coupled to receive one or more external or internal events, wherein said event logic comprises:

one or more event selectors, wherein each of said event selectors includes a plurality of inputs and at least one output, wherein, for each event selector, at least one of said plurality of inputs is adapted to couple to an event source to receive an event signal from the event source, wherein each of said event selectors is operable to select one of said event signals and provide said selected event signal on said at least one output;

one or more event mappers, wherein each of said one or more event mappers corresponds to at least one of said event selectors, wherein each of said event mappers includes an input which receives one of said selected event signals output from a corresponding one of said event selectors, wherein each of said event mappers is operable to provide said selected event signal to one or more destinations;

wherein said destinations are operable to cause an action to be performed by the data acquisition device in response to receipt of said selected event signal;

wherein said central processing unit on said computer system is not required to service interrupts arising from said event signals.

28. The data acquisition system of claim 27, wherein the computer system comprises one of:

a personal computer;

a PDA;

an industrial computer;

a PXI computer.

29. The data acquisition system of claim 27, wherein the data acquisition device further comprises:

a timing/triggering circuit having a plurality of timers and/or counters, each timer and/or counter operable to function independently of the other timers and/or counters;

wherein each one of said one or more event selectors is operable to be assigned to an output of one of the plurality of timers and/or counters, and wherein each one of said one or more event mappers is operable to be assigned to an input of one of the plurality of timers and/or counters, wherein the event logic is operable to generate and sequence separate internal or external events.

* * * * *